United States Patent
Chi et al.

(10) Patent No.: US 10,128,472 B2
(45) Date of Patent: Nov. 13, 2018

(54) SECONDARY BATTERY HEAD COVER ASSEMBLY, SECONDARY BATTERY INCLUDING THE SAME AND ASSEMBLING METHOD THEREOF

(71) Applicant: CONTEMPORARY AMPEREX TECHNOLOGY CO., LIMITED, Ningde (CN)

(72) Inventors: Qingkui Chi, Ningde (CN); Kaifu Zhong, Ningde (CN)

(73) Assignee: Contemporary Amperex Technology Co., Limited, Ningde, Fujian Province (CN)

( * ) Notice: Subject to any disclaimer, the term of this patent is extended or adjusted under 35 U.S.C. 154(b) by 67 days.

(21) Appl. No.: 15/349,931

(22) Filed: Nov. 11, 2016

(65) Prior Publication Data
US 2017/0279091 A1    Sep. 28, 2017

(30) Foreign Application Priority Data
Mar. 28, 2016    (CN) .......................... 2016 1 0181816

(51) Int. Cl.
*H01M 2/20*    (2006.01)
*H01M 2/04*    (2006.01)
*H01M 2/12*    (2006.01)

(52) U.S. Cl.
CPC ....... *H01M 2/0482* (2013.01); *H01M 2/0473* (2013.01); *H01M 2/1264* (2013.01)

(58) Field of Classification Search
CPC . H01M 2/0482; H01M 2/1264; H01M 2/0473
See application file for complete search history.

(56) References Cited

U.S. PATENT DOCUMENTS

2011/0311851 A1*  12/2011  Shinoda ................ H01M 2/263
                                                                  429/94
2012/0160559 A1*   6/2012  Tsutsumi .............. H01M 2/021
                                                                  174/551

FOREIGN PATENT DOCUMENTS

CN            2773913 Y      4/2006
CN         201927645 U       8/2011
(Continued)

OTHER PUBLICATIONS

From Chinese Application No. 201610181816.8. Office Action dated Oct. 9, 2017 and English translation from Global Dossier.
(Continued)

*Primary Examiner* — Cynthia K Walls
(74) *Attorney, Agent, or Firm* — Ladas & Parry, LLP

(57)    ABSTRACT

The present application relates to a secondary battery head cover assembly, a secondary battery including the same and an assembling method thereof. The secondary battery head cover assembly includes a head cover and an insulation structure, the insulation structure includes a top connection sheet and two naked battery core insulation sheets, an electrode pole is provided on the head cover, and an electrode pole through hole, through which the electrode pole passes, is provided at a position on the top connection sheet corresponding to the electrode pole, the top connection sheet is located below the head cover and is fixed to the head cover. The secondary battery includes the secondary battery head cover assembly and the naked battery core, the naked battery core is located below the top connection sheet, and the two naked battery core insulation sheets wrap the side and bottom surfaces of the naked battery core.

13 Claims, 3 Drawing Sheets

(56) References Cited

FOREIGN PATENT DOCUMENTS

| CN | 102280606 A | 12/2011 |
|---|---|---|
| CN | 103258983 A | 8/2013 |
| CN | 205429021 U | 8/2016 |

OTHER PUBLICATIONS

From Chinese Application No. 201610181816.8. Office Action dated Apr. 11, 2018 with English translation from Global Dossier.

* cited by examiner

SECONDARY BATTERY HEAD COVER ASSEMBLY, SECONDARY BATTERY INCLUDING THE SAME AND ASSEMBLING METHOD THEREOF

CROSS-REFERENCE TO RELATED APPLICATIONS

The present application claims priority to Chinese Patent Application No. 201610181816.8, filed on Mar. 28, 2016, the content of which is incorporated herein by reference in its entirety.

TECHNICAL FIELD

The present application relates to the technical field of secondary battery production and, more particularly, to a secondary battery head cover assembly, a secondary battery including the same and an assembling method thereof.

BACKGROUND

Insulation sheet is typically provided in a secondary battery, which can effectively prevent side walls and bottom surface of the naked battery core from contacting with housing of the secondary battery.

In the related art, the secondary battery is typically formed as a connection structure by buckling a top bracket on each long side of the head cover, respectively, and protruding a lower plastic of an electrode pole downward from a short side of the head cover to be parallel and level with the top bracket. During assembly, the naked battery core is first assembled with the above connection structure by connecting with a top connection sheet. Then, the naked battery core insulation sheet goes upward gradually from the bottom of the naked battery core to wrap a side wall of the naked battery core, and finally, is hot-melt connected with the top bracket and the lower plastic.

In such a connection structure, however, both the lower plastic and the top bracket need to protrude downward a certain distance along the head cover, and therefore, when assembled, a certain height space needs to be occupied, which is undesired for simplifying the assembling process and improving the capacity of the battery.

SUMMARY

The present application provides a secondary battery head cover assembly, a secondary battery including same and an assembling method thereof, and is capable of improving capacity of the secondary battery.

In a first aspect of the present application, a secondary battery head cover assembly is provided, including a head cover and an insulation structure, wherein the insulation structure comprises a top connection sheet and two naked battery core insulation sheets, and the two naked battery core insulation sheets are connected to two long sides of the top connection sheet, respectively, an electrode pole is provided on the head cover, and an electrode pole through hole, through which the electrode pole passes, is provided at a position on the top connection sheet corresponding to the electrode pole, the top connection sheet is located below the head cover and is fixed to the head cover.

Preferably, at least one connecting hole for connecting to the head cover is provided on the top connection sheet, at least one connecting piece is provided on a lower surface of the head cover, and the connecting piece is fitted with and connected to the connecting hole.

Preferably, the connecting piece is a riveting piece or an engaging piece.

Preferably, a lower plastic is provided on the head cover, and the top connection sheet is fixed with the lower plastic by hot melt.

Preferably, the top connection sheet and the two naked battery core insulation sheets are integrated as a whole.

Preferably, the head cover is further provided with at least one of a liquid injection hole, an explosion-proof valve, and a reversing sheet, and the top connection sheet is further provided with at least one of a liquid injection through hole, an explosion-proof valve air hole, and a reversing sheet air hole, wherein, the liquid injection through hole is provided correspondingly below the liquid injection hole, the explosion-proof valve air hole is provided correspondingly below the explosion-proof valve, and the reversing sheet air hole is provided correspondingly below the reversing sheet.

In a second aspect of the present application, a secondary battery is provided, including a naked battery core and the secondary battery head cover assembly as described above, the naked battery core is located below the top connection sheet, and the two naked battery core insulation sheets wrap side and bottom surfaces of the naked battery core.

Preferably, the naked battery core insulation sheet includes: a main insulation region directly connected with the top connection sheet, a side insulation region formed by extending the main insulation region outward along two lateral sides perpendicular to the long side, and a bottom insulation region formed by extending the main insulation region outward along a side away from the top connection sheet, wherein the bottom insulation region is provided with an electrolyte permeation hole, the two main insulation regions cover two main side surfaces of the naked battery core, respectively, the side insulation region covers a narrow side surface of the naked battery core, the bottom insulation region covers a bottom surface of the naked battery core, the side insulation regions being located on different naked battery core insulation sheets which cover the same side of the naked battery core are connected with each other, and the two bottom insulation regions are also connected with each other.

Preferably, the battery further includes a chassis plate, wherein the chassis plate is fixedly attached to a surface of one of the bottom insulation regions.

Preferably, the two naked battery core insulation sheets have consistent structures.

Preferably, crease lines are provided at a junction between the main insulation region and the side insulation region, and at a junction of a junctional region between the main insulation region and the bottom insulation region.

Preferably, the side insulation regions located on different naked battery core insulation sheets which cover the same side of the naked battery core are connected with each other by hot melting, and/or the two bottom insulation regions are connected with each other by hot melting.

In a third aspect of the present application, an assembling method of the secondary battery is provided, including steps as follows:

fixing the top connection sheet to the head cover;
welding the naked battery core and the head cover; and wrapping the side and bottom surfaces of the naked battery core by the naked battery core insulation sheet.

The technical solutions provided by the present application have the following beneficial effects that:

By connecting the top connection sheet with the head cover, the secondary battery head cover assembly provided by the present application changes the original assembling method, there is no need to provide a top bracket any more, thus saving internal space of the secondary battery, and improving energy density.

It should be understood that both the foregoing general description and the following detailed description are only illustrative, which are not intended to limit the present application.

REFERENCE NUMERALS

Figure 1:
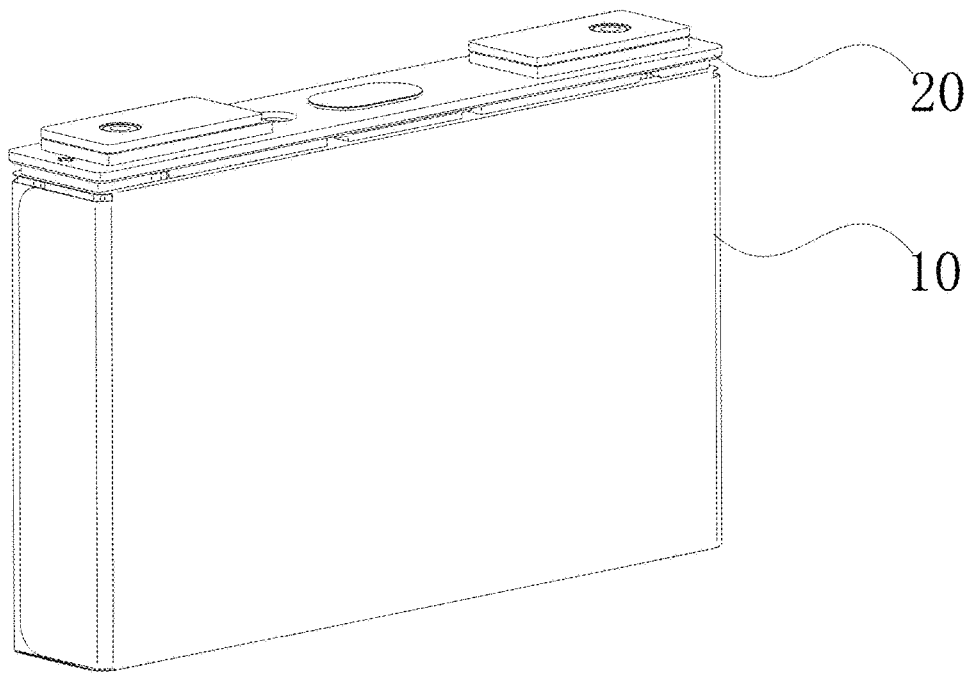
FIG. 1 is a structural schematic diagram of a secondary battery according to an embodiment of the present application after a housing is removed.

10—insulation structure;
100—top connection sheet;
  100a—electrode pole through hole;
  100b—explosion-proof valve air hole;
  100c—liquid injection through hole;
  100d—hot melt region;
  100e—connecting hole;
  100f—reversing sheet air hole;
101—naked battery core insulation sheet;
  101a—main insulation region;
  101b—side insulation region;
  101c—bottom insulation region;
  101d—electrolyte permeation hole;
  101e—crease line;
102—chassis plate;
20—head cover;
200—connecting piece;
30—naked battery core.

The accompanying drawings, which are incorporated herein and constitute a part of this specification, illustrate the embodiments of the present application and, together with the specification, serve to explain the principles of the present application.

DESCRIPTION OF EMBODIMENTS

The present application will be further described in detail with reference to the drawings in combination with the detailed embodiments. Expressions, such as front, rear, left, right, up and down described herein are all with reference to a placement state of the secondary battery head cover assembly in the drawings.

As shown in FIG. 1, embodiments of the present application provide a secondary battery, including a secondary battery head cover assembly having an insulation structure 10 and a head cover 20, and further including several major components such as a naked battery core 30 and a housing (not shown). Particularly, the head cover 20, together with the housing, defines a closed cavity in which the naked battery core 30 is placed. The head cover 20 is provided with an electrode pole, and may also be provided with conventional structures such as an explosion-proof valve, a liquid injection hole and a reversing sheet.

Figure 2:
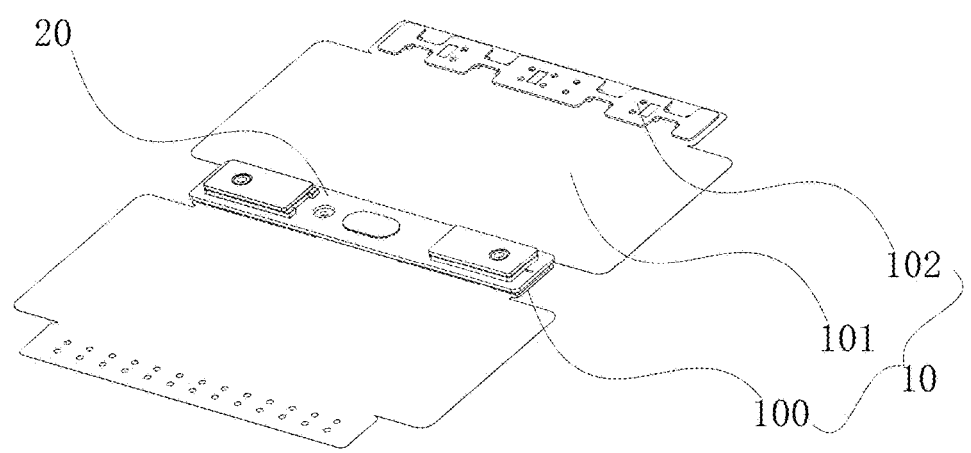
FIG. 2 is a structural schematic diagram of assembling a secondary battery head cover assembly according to an embodiment of the present application.
Figure 3:
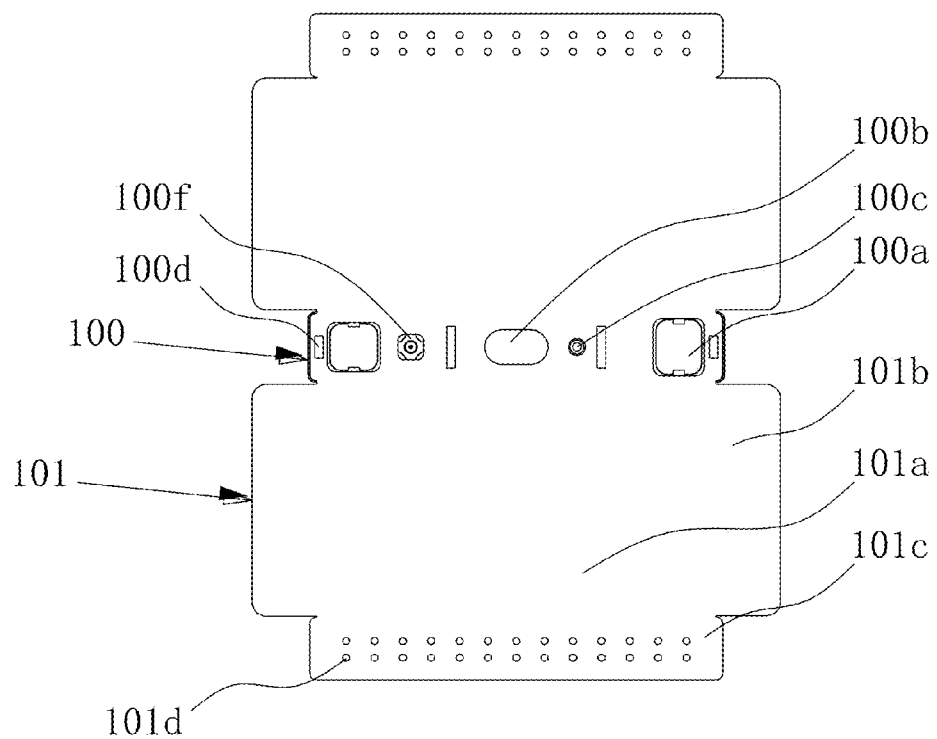
FIG. 3 is an exploded structural schematic diagram of an insulation structure with a hot melt region on a top connection sheet according to an embodiment of the present application.
Figure 4:
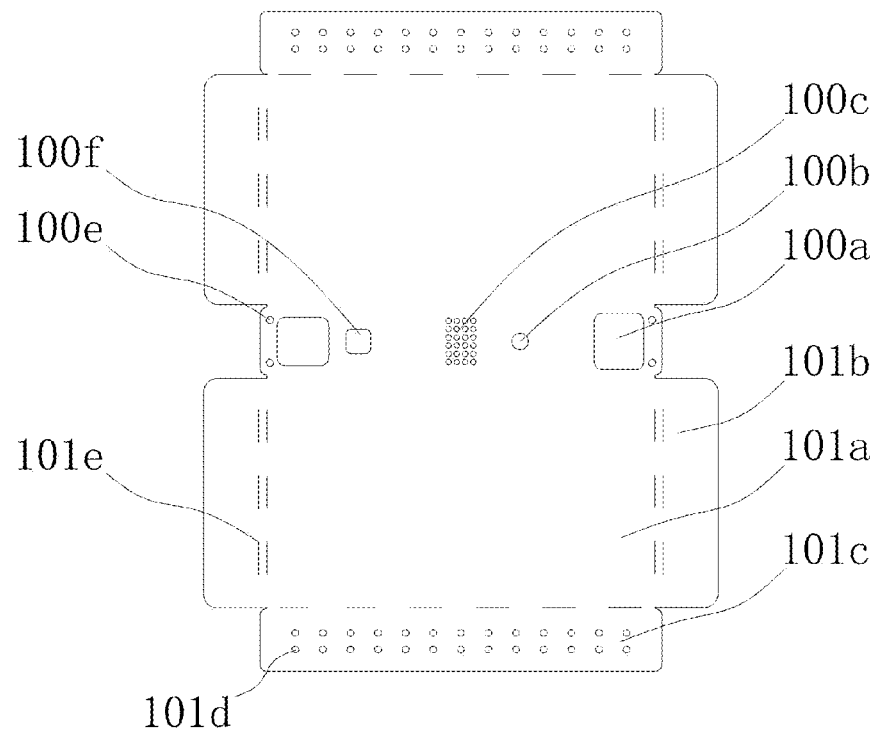
FIG. 4 is an exploded structural schematic diagram of an insulation structure with a connecting hole on a top connection sheet according to an embodiment of the present application.

The secondary battery head cover assembly 10 is to prevent most of the areas on the naked battery core 30 from contacting with the inner wall of the closed cavity, as shown from FIG. 2 to FIG. 4, it specifically includes a top connection sheet 100 and two naked battery core insulation sheets 101. The top connection sheet 100 is located below the head cover 20 and is fixed to the head cover 20, on one hand, the top connection sheet 100 serves as a connection structure between the secondary battery head cover assembly 10 and the head cover 20, on the other hand, it can also be used to isolate most of the areas on top portion of the naked battery core 30 from the head cover 20, and therefore, the top connection sheet 100 only provides respective runout structures such as electrode pole through hole 100a, explosion-proof valve air hole 100b, liquid injection hole 100c and a reversing sheet air hole 100f corresponding to positions of the electrode pole, the explosion-proof valve, the liquid injection hole and the reversing sheet, and the remaining areas are integrated isolation structures. When the top connection sheet 100 is connecting to the head cover 20, an electrode pole of the head cover will pass through the electrode pole through hole 100a, the liquid injection through hole 100b is provided correspondingly below the liquid injection hole, the explosion-proof valve air hole 100c is provided correspondingly below the explosion-proof valve, the explosion-proof valve air hole 100c can have a shape substantially the same with the explosion-proof valve (refer to FIG. 3), and can also be made as a screen shape (refer to FIG. 4), and the reversing sheet air hole 100f is also provided correspondingly below the reversing sheet.

The two naked battery core insulation sheets 101 are connected to two long sides of the top connection sheet 100, respectively, for wrapping the main side surface, the narrow side surface and the bottom of the naked battery core 30. The top connection sheet 100 is preferably integrally formed with the two naked battery core insulation sheets 101.

As shown in FIG. 3 and FIG. 4, the naked battery core insulation sheet 101 specifically includes a main insulation region 101a, a side insulation region 101b and a bottom insulation region 101c. The main insulation region 101a is in direct connection with a long side of the top connection sheet 100, the naked battery core 30 is located below the top connection sheet 100, and the main insulation region 101a can cover the main side surface of the naked battery core 30 after being bended downward at an angle of 90 degrees at a junction thereof. The side insulation region 101b is formed by extending the main insulation region 101a outward along two lateral sides perpendicular to the long side, and can cover the narrow side surface of the naked battery core 30 after being bended to the interior of the naked battery core 30 at an angle of 90 degrees at a junction thereof. The bottom insulation region 101c is formed by extending the main insulation region 101a outward along a side away from the top connection sheet 100, and can cover the bottom surface of the naked battery core 30 after being bended to the interior of the naked battery core 30 at an angle of 90 degrees at a junction thereof. In order to smoothly let the electrolyte contact with the naked battery core, the bottom insulation region 101c is also provided with an electrolyte permeation hole 101d. In the present embodiment, the top connection sheet 100 and two naked battery core insulation sheets 101 need to have a good bending property, so as to wrap the naked battery core 30. To this end, crease lines 101e are provided at a junction between the main insulation region and the side insulation region, and at a junction of a junctional region between the main insulation region and the bottom insulation region, the thickness of the crease line 101e can be thinner than other areas, so as to provide a more excellent bending capability, generally, the width of the crease line 101e can be kept around 0.2 mm.

Figure 5:
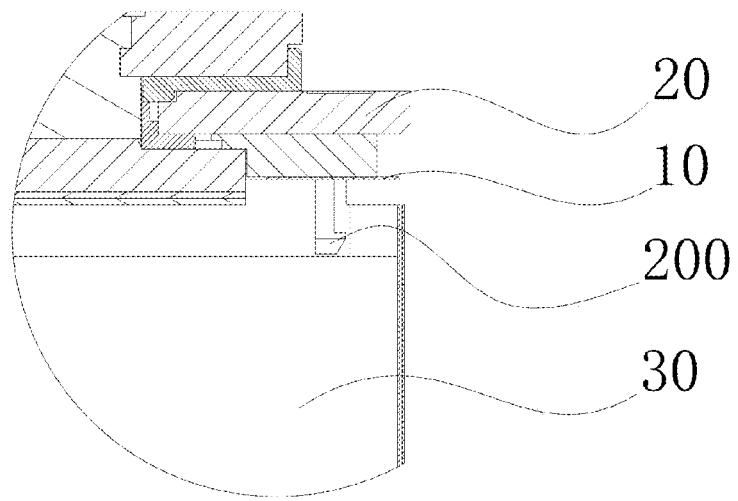
FIG. 5 is a partial cross-sectional structural schematic diagram of a secondary battery according to an embodiment of the present application.

The secondary battery provided in the present embodiment adopts the assembling method as follows:

Step one, fixing the top connection sheet 100 to the head cover 20 (refer to FIG. 2). Here, a number of fixed manners can be adopted, for example, the top connection sheet 100 and the lower plastic on the head cover can be fixed directly together by means of hot melting or welding. As shown in FIG. 3, when such manner is adopted, the hot melt region 100d is preferred to be uniformly distributed on the top connection sheet 100. As shown in FIG. 4, a connecting piece 200, such as a riveted piece or an engaged piece, can also be provided on the lower surface of the head cover 20, and a connecting hole 100e corresponding to the connecting piece 200 is provided on the top connection sheet 100, subsequently, the connecting piece 200 is fitted with the connecting hole 100e, such as by riveting or buckling (refer to FIG. 5), as so to achieve the connection between the top connection sheet 100 and the head cover 20.

Step two, welding the naked battery core 30 with the head cover 20. Here, the head cover 20 and the top connection sheet 100 are placed together on top of the naked battery core 30, subsequently, welding corresponding parts of the naked battery core 30 and the head cover 20 together, the corresponding parts mainly are an electrode tab and the electrode pole.

Step three, wrapping the side wall and the bottom surface of the naked battery core 30 with the naked battery core insulation sheet 101. In this step, firstly, there is a need to bend the main insulation region 101a, the side insulation region 101b and the bottom insulation region 101c to different positions, respectively. In particular, bending the two main insulation regions 101a from the junction with the top connection sheet 100 downward at an angle of approximate 90 degrees, bending the side insulation region 101b connected with each main insulation region 101a at an angle of 90 degrees towards the opposite side, bending the two bottom insulation regions 101c at an angle of 90 degrees towards the top connection sheet 100, and finally, wrapping the side surface and the bottom surface of the whole naked battery core 30 substantially.

Step four, connecting the side insulation regions 101b located on different naked battery core insulation sheets 101 which cover the same side of the naked battery core 30 with each other, and also connecting the two bottom insulation regions 101c with each other. During the connection, the side insulation regions 101b can be connected firstly, or the two bottom insulation regions 101c can be connected firstly, the connecting manner is generally hot melt welding, besides, in order to improve the overall connection strength, the welding region is also preferred to be uniformly distributed.

In terms of each naked battery core insulation sheet 101, the side insulation region 101b and bottom insulation region 101c on one naked battery core insulation sheet may differ from the side insulation region 101b and bottom insulation region 101c on another naked battery core insulation sheet, as long as the narrow side surface and the bottom surface of the naked battery core 30 can be completely covered, and sufficient hot melt regions are left. To facilitate manufacturing, the two naked battery core insulation sheets 101 are preferred to have consistent structures.

The weight of the naked battery core 30 mainly concentrates on the bottom surface, and therefore, the bottom insulation region 101c will bear major force. As a result, the hot melt region of the bottom insulation region 101c tends to be disengaged or the bottom insulation region 101c is damaged on the whole. To prevent the bottom insulation region 101c from being disengaged or damaged, the secondary battery head cover assembly 10 in the present embodiment also includes a chassis plate 102. The chassis plate 102 can be made from materials with higher strength, prior to assembly, the chassis plate is fixedly attached to a surface on any of the bottom insulation regions 101c, here, the structure of the chassis plate 102 and the attaching position should be designed carefully, so as not to shield the electrolyte permeation hole 101d. Generally, the fixing is generally done by hot melting, several hot melt regions with a fixed spacing on the chassis plate 102 are left, and meanwhile, hot melt regions are also left on corresponding positions on the bottom insulation region 101c to be attached, then, the hot melt region is welded by hot melting correspondingly.

During the process of wrapping the naked battery core 30, the bottom insulation region 101c without connecting to the chassis plate 102 is located at the inner side, the bottom insulation region 101c attached with the chassis plate 102 is located in the middle, and the chassis plate 102 is located at the bottom-most part. By means of the higher strength of the chassis plate 102, the bottom insulation region 101c can effectively be prevent from severe local deformation under the action of the naked battery core 30, and thus prevent the bottom insulation region 101c from being disengaged or damaged.

By changing the structure and the assembling method, the present embodiment saves internal space of the secondary battery, so as to improve energy density.

Described above are merely preferred embodiments of the present application, which are not intended to limit the present application, various modifications and variations will be apparent to persons skilled in the art. Any modification, equivalent replacement, improvement, etc. made without departing from the spirit and principle of the present application shall fall within the protection scope of the application.

What is claimed is:

1. A secondary battery head cover assembly, comprising a head cover and an insulation structure, wherein the insulation structure comprises a top connection sheet and two naked battery core insulation sheets, and the two naked battery core insulation sheets are connected to two long sides of the top connection sheet, respectively, an electrode pole is provided on the head cover, and an electrode pole through hole, through which the electrode pole passes, is provided at a position on the top connection sheet corresponding to the electrode pole, the top connection sheet is located below the head cover and is fixed to the head cover, wherein, the head cover is further provided with a liquid injection hole, and the top connection sheet is further provided with a liquid injection through hole, and the liquid injection through hole is provided correspondingly below the liquid injection hole.

2. The secondary battery head cover assembly according to claim 1, wherein, at least one connecting hole for connecting to the head cover is provided on the top connection sheet, at least one connecting piece is provided on a lower surface of the head cover, and the connecting piece is fitted with and connected to the connecting hole.

3. The secondary battery head cover assembly according to claim 2, wherein, the connecting piece is a riveting piece or an engaging piece.

4. The secondary battery head cover assembly according to claim 1, wherein, a lower plastic is provided on the head cover, and the top connection sheet is fixed with the lower plastic by hot melting.

5. The secondary battery head cover assembly according to claim 1, wherein, the top connection sheet and the two naked battery core insulation sheets are integrated as a whole.

6. The secondary battery head cover assembly according to claim 1, wherein, the head cover is further provided with at least one of an explosion-proof valve and a reversing sheet, and the top connection sheet is further provided with at least one of an explosion-proof valve air hole and a reversing sheet air hole, wherein, the explosion-proof valve air hole is provided correspondingly below the explosion-proof valve, and the reversing sheet air hole is provided correspondingly below the reversing sheet.

7. A secondary battery, comprising a naked battery core and the secondary battery head cover assembly according to claim 1, wherein the naked battery core is located below the top connection sheet, and the two naked battery core insulation sheets wrap side and bottom surfaces of the naked battery core.

8. The secondary battery according to claim 7, wherein, the naked battery core insulation sheet comprises:

a main insulation region directly connected with the top connection sheet, a side insulation region formed by extending the main insulation region outward along two lateral sides perpendicular to the long side, and a bottom insulation region formed by extending the main insulation region outward along a side away from the top connection sheet, wherein the bottom insulation region is provided with an electrolyte permeation hole, the two main insulation regions cover two main side surfaces of the naked battery core, respectively, the side insulation region covers a narrow side surface of the naked battery core, the bottom insulation region covers a bottom surface of the naked battery core, the side insulation regions located on different naked battery core insulation sheets which cover the same side of the naked battery core are connected with each other, and the two bottom insulation regions are also connected with each other.

9. The secondary battery according to claim 8, further comprising a chassis plate, wherein the chassis plate is fixedly attached to a surface of one of the bottom insulation regions.

10. The secondary battery according to claim 8, wherein, the two naked battery core insulation sheets have consistent structures.

11. The secondary battery according to claim 8, wherein, crease lines are provided at a junction between the main insulation region and the side insulation region, and at a junction of a junctional region between the main insulation region and the bottom insulation region.

12. The secondary battery according to claim 8, wherein:

the side insulation regions located on different naked battery core insulation sheets which cover the same side of the naked battery core are connected with each other by hot melting, and/or the two bottom insulation regions are connected with each other by hot melting.

13. A method for assembling the secondary battery according to claim 7, comprising steps as follows:

fixing the top connection sheet to the head cover;

welding the naked battery core and the head cover; and wrapping the side and bottom surfaces of the naked battery core by the naked battery core insulation sheet.

* * * * *